United States Patent
Herrmann et al.

(10) Patent No.: US 11,592,301 B2
(45) Date of Patent: Feb. 28, 2023

(54) METHOD FOR PROVIDING A DIGITAL ROAD MAP

(71) Applicant: Robert Bosch GmbH, Stuttgart (DE)

(72) Inventors: Martin Herrmann, Korntal (DE); Christian Heinzemann, Ludwigsburg (DE); Dirk Ziegenbein, Freiberg Am Neckar (DE); Martin Butz, Steinheim An der Murr (DE); Michael Rittel, Markgroeningen (DE); Nadja Schalm, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 89 days.

(21) Appl. No.: 16/887,601

(22) Filed: May 29, 2020

(65) Prior Publication Data
US 2020/0408543 A1 Dec. 31, 2020

(30) Foreign Application Priority Data
Jun. 28, 2019 (DE) .......................... 102019209535.6

(51) Int. Cl.
| G01C 21/34 | (2006.01) |
| B60W 60/00 | (2020.01) |
| G07C 5/08 | (2006.01) |
| G01C 21/30 | (2006.01) |
| B60W 50/04 | (2006.01) |

(52) U.S. Cl.
CPC ......... *G01C 21/3407* (2013.01); *B60W 50/04* (2013.01); *B60W 60/0025* (2020.02); *G01C 21/30* (2013.01); *G07C 5/0808* (2013.01)

(58) Field of Classification Search
CPC ............... G01C 21/3407; G01C 21/30; G01C 21/3833; G01C 21/387; G01C 21/3815; G01C 21/26; G01C 21/20; B60W 50/04; B60W 60/0025; G07C 5/0808; G07C 5/08; G06F 16/29
See application file for complete search history.

(56) References Cited

U.S. PATENT DOCUMENTS 10,482,003 B1 * 11/2019 Bondor ................... G06F 30/15
10,599,546 B1 * 3/2020 Walther .............. G06F 11/3457
(Continued)

OTHER PUBLICATIONS

Graphics, T. (n.d.). Terrain Generation for driving simulations—asam. Terrain Generation for Driving Simulation. Retrieved Dec. 1, 2021, from https://www.asam.net/index.php?eID=dumpFile&t=f&f=1998token=bd3ff9aecb6baf1c7947-70bc08f81a910005399e.*

(Continued)

*Primary Examiner* — Faris S Almatrahi
*Assistant Examiner* — Abdalla A Khaled
(74) *Attorney, Agent, or Firm* — Norton Rose Fulbright US LLP; Gerard Messina

(57) ABSTRACT

A computer-implemented method for providing a digital road map for testing an at least partially automated vehicle system. the method includes: accessing a database in which are stored permissible characteristics of the road properties for a multitude of road properties; creating at least one road map section by one of the possible characteristics being selected for the road map section for the first of the multitude of road properties, in each particular case in automated fashion from the database; providing the digital road map, the digital road map including the at least one road map section.

21 Claims, 3 Drawing Sheets

(56) References Cited

U.S. PATENT DOCUMENTS

| | | | | |
|---|---|---|---|---|
| 11,086,318 | B1* | 8/2021 | Davis | G05D 1/0291 |
| 2016/0210383 | A1* | 7/2016 | Alaniz | G06F 30/20 |
| 2017/0316127 | A1* | 11/2017 | Han | G06V 20/582 |
| 2019/0213290 | A1* | 7/2019 | Delva | G01M 17/007 |
| 2019/0228571 | A1* | 7/2019 | Atsmon | G01C 21/3815 |
| 2020/0065443 | A1* | 2/2020 | Liu | G06F 11/3664 |
| 2020/0074266 | A1* | 3/2020 | Peake | G06V 10/774 |
| 2020/0250363 | A1* | 8/2020 | Partridge | G06F 30/15 |
| 2020/0310403 | A1* | 10/2020 | Huang | G05D 1/0088 |
| 2020/0310450 | A1* | 10/2020 | Reschka | B60W 60/0011 |
| 2020/0380773 | A1* | 12/2020 | Gundling | G07C 5/0808 |
| 2021/0063200 | A1* | 3/2021 | Kroepfl | G01C 21/3811 |
| 2021/0237772 | A1* | 8/2021 | Meltz | G06F 30/20 |
| 2021/0341935 | A1* | 11/2021 | Du | G06F 11/3688 |

OTHER PUBLICATIONS

Haubrich, T. (Mar. 2014). A semantic road network model for traffic simulations in virtual environments: generation and . . Retrieved Dec. 1, 2021, from https://www.researchgate.net/publication/261365483_A_Semantic_Road_Network_Model_for_Traffic_Simulations_in_Virtual_Environments_Generation_and_Integration.*

Graphics, T. (n.d.). Terrain Generation for driving simulations—asam. Terrain Generation for Driving Simulation . Retrieved Dec. 1, 2021, from https://www.asam.net/index.php?eID=dumpFile&t=f=1998&token=bd3ff9aecb6baf1c794770bc08f81a9100-05399e.*

Martin Herrmann et al, "Configuration and Generation of Road Segments and Junctions for Verification of Autonomous Systems", Kick-Off Workshop ASAM OpenDRIVE, Oct. 1, 2018 (Oct. 1, 2018), XP055771992, 11 pages.

Fabian Schuldt, "A contribution to the methodical test of automated driving functions with the aid of virtual environments", Dissertation, Feb. 13, 2017 (Feb. 13, 2017), XP055772179, 249 pages.

Gräfe Gunnar, "OpenDRIVE Project Experience and the Need for a Reference Implementation and Visualization", Oct. 9, 2018 (Oct. 9, 2018), XP055772246, 25 pages.

* cited by examiner

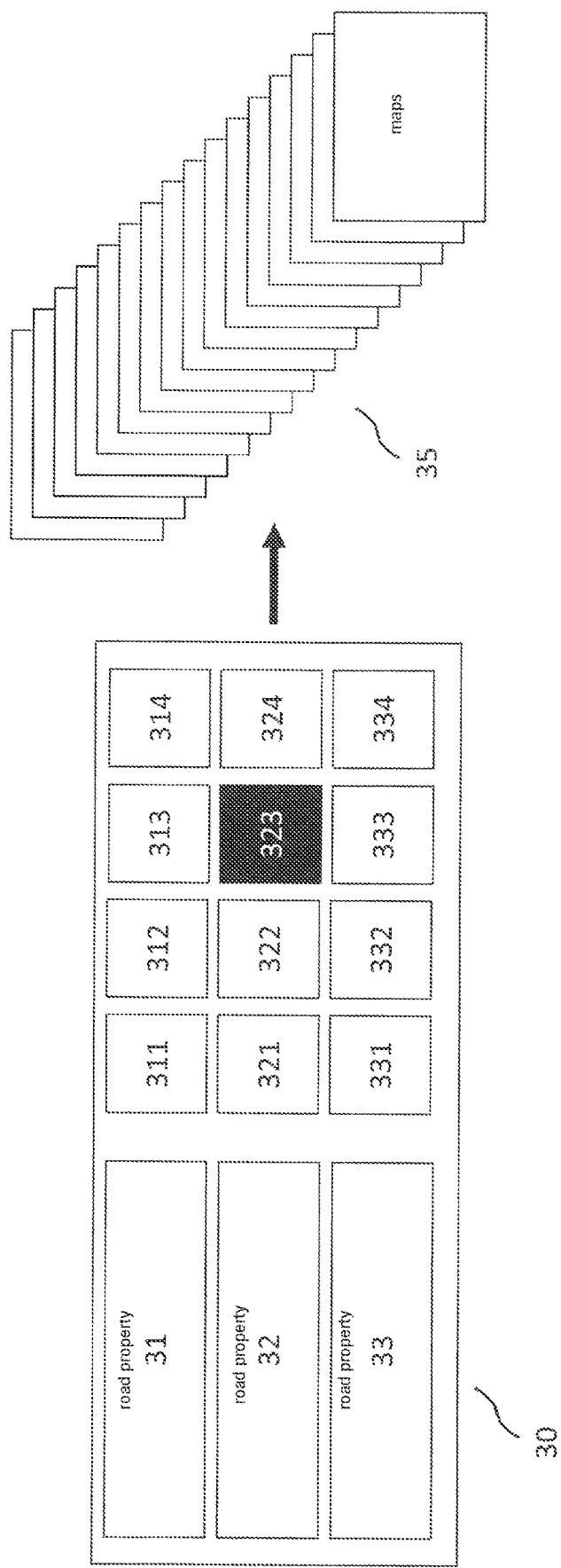

METHOD FOR PROVIDING A DIGITAL ROAD MAP

CROSS REFERENCE

The present application claims the benefit under 35 U.S.C. § 119 of German Patent Application No. DE 102019209535.6 filed on Jun. 28, 2019, which is expressly incorporated herein by reference in its entirety.

FIELD

The present invention relates to computer-implemented methods for providing a digital road map, in particular, for testing an at least partially automated vehicle system.

BACKGROUND INFORMATION

Automated vehicle systems must be designed for many different situations. The reliability of such systems poses a significant technical challenge. The relevant safety requirement tests are extremely complex due to the infinitely large range of possible driving situations, and they are hard to represent by real-world tests alone. It is desirable that the tests be appropriately supported by simulations. A particular challenge in such simulations is to ensure the broadest possible and, ideally, also quantifiable coverage of the possible situations.

Road maps for simulative tests of vehicle systems are primarily created by measuring real roads using highly accurate sensor systems and by subsequently manually digitally post-processing the measurement data. Editors, which may be used to manually define maps, constitute another common way to create such road maps. In addition, there are tile-based road editors where pregenerated road elements are provided on square tiles or hexagon tiles, which can be placed against one another manually.

A possible map format for the simulation is OpenDRIVE, which is supported by many common simulation environments. Road maps can also be directly manually specified here using a text editor as XML.

U.S. Patent Application Publication No. US 2017/0316127 A1 describes a method for providing a testing scenario for a driverless vehicle. A specific embodiment provides that the OpenDRIVE file format, which makes possible a logical description of road networks, thereby be used to simulate the driving environment.

SUMMARY

In accordance with the present invention, a computer-implemented method for providing a digital road map is provided, in particular for testing an at least partially automated vehicle system. In accordance with the present invention, in an example embodiment, access is made to a database in which are stored permissible characteristics of the road properties for a multitude of road properties. At least one road map section is created by one of the possible characteristics being selected for the road map section for the first of the multitude of road properties, in each particular case in automated fashion from the database. In the end, the at least one digital road map is provided, the digital road map including the at least one road map section.

The example method in accordance with the present invention makes it possible for a digital road map or a plurality of digital road maps to be automatically computed, generated and provided; the degree of complexity is substantially reduced in comparison to manual creation in map editors. In addition, preconfigurations or the consideration of boundary conditions or limitations are also partially permitted. A large number of different maps and specified boundary conditions may be generated by automatically varying parameters. The generation on the basis of the database having relevant road properties and alternative, permissible characteristics of the road properties enables a greatest possible and optionally also quantifiable coverage of the entire parameter space, respectively assurance of a certain degree of coverage. The approach is arbitrarily parallelizable and allows a significant reduction in complexity due to automatic computer-implemented generation.

The example method in accordance with the present invention thereby makes it possible for 2D or 3D maps to be automatically generated using, for example, freely determined and, in particular, also automatically varied values from parameter ranges for the characteristics of road properties, for example, of any curve radii, gradients, road types, number of lanes, etc., which appreciably exceed the possibilities, for example, of common tile-based methods. For this purpose, the automation may, in particular access a random selection of discrete alternatives for characteristics, respectively a random selection of continuous parameter ranges for characteristics.

The example method according to the present invention already contributes to diminishing the complexity of the large parameter space by the structure of the data in the database. Customized digital road maps may be provided by optional partial configurations or by the configured limitation of characteristics; moreover, the multitude of variants is hereby further reduced. By additionally optionally introducing equivalence classes, on whose basis, a degree of coverage may also be determined, the complexity may be further reduced and maps systematically provided that cover the possible area of the maps as effectively as possible within the predetermined boundary conditions.

Advantageous embodiments of the present invention provide that a plurality of road map sections be generated which are combined to form a digital map. This makes possible an especially flexible and modular method. The compatibility of the assembled segments, as well as matching transitions therebetween are ensured in automated fashion.

Impermissible combinations of characteristics of properties are advantageously ruled out already upon calculation and generation of the digital maps. In addition, before being provided, the generated map still optimally undergoes a consistency check. Thus, in spite of the high degree of automation, the example method permits a high-quality output.

Especially preferred embodiments of the present invention provide that the described methods be used in such a way that the at least one provided map be used for testing an at least partially automated vehicle system. In a simulative test, the vehicle system is thereby checked during a drive along a route on a digital road map that is provided as described, to determine whether at least one predetermined requirement is observed, in particular a safety requirement made of the vehicle system during the simulated drive.

Thus, a fully automated test method for driving systems may be implemented because of the mentioned advantages of providing maps, such as the broad and possibly also assured coverage, for example.

The example methods according to the present invention are computer-implemented. For this purpose, a computer processing unit executes a computer program which is stored on a machine-readable storage medium, and, to this end, is adapted for implementing the described methods.

Specific embodiments of the present invention are explained in greater detail below with reference to the figures.

BRIEF DESCRIPTION OF THE DRAWINGS

FIG. 3 schematically illustrates another exemplary provision of a plurality of digital road maps in the case of a partial configuration of a database containing road properties in accordance with the present invention.

DETAILED DESCRIPTION OF EXAMPLE EMBODIMENTS

Figure 1:
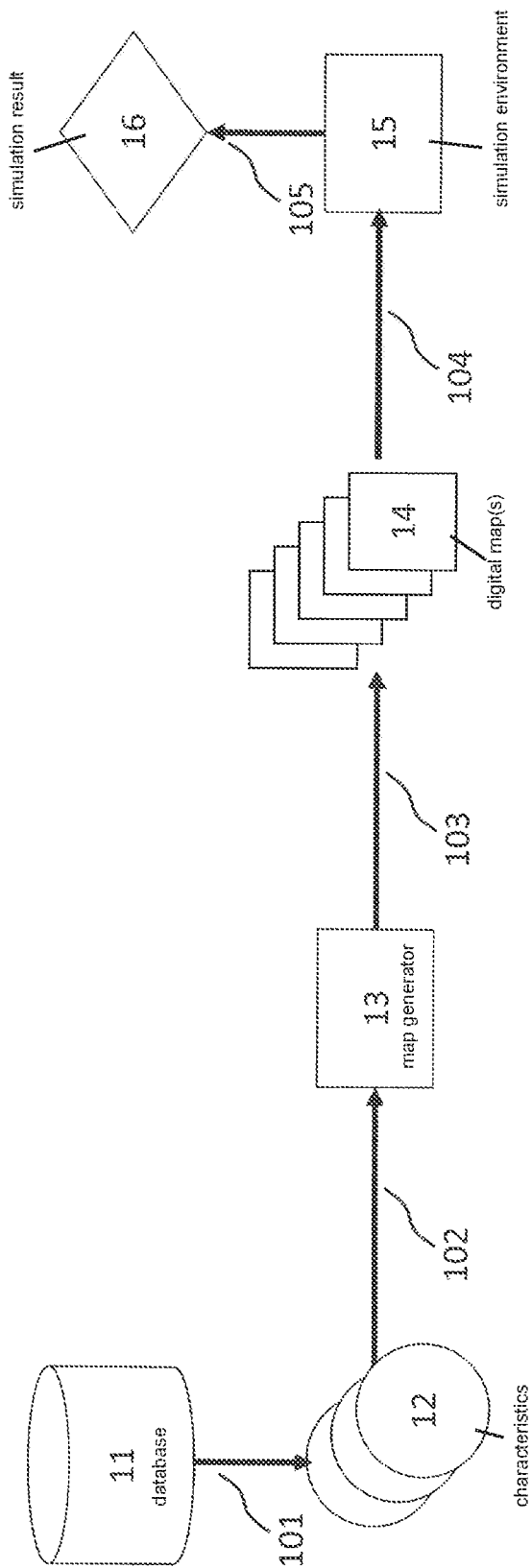
FIG. 1 schematically illustrates the exemplary sequence of a computer-implemented method for providing a digital road map in accordance with the present invention.

FIG. 1 schematically shows the exemplary sequence of a computer-implemented method for providing a digital road map and the use thereof for the simulative test of a vehicle system, in accordance with the present invention.

In a first step 101, randomly selected plus possibly predetermined characteristics 12 for selected properties are drawn from a database 11 in which are stored characteristics of the properties which are permissible for certain road properties.

The database thereby contains the assignment of road properties and characteristics which are permissible for the road properties, the characteristics being determined in such a way that they are mutually exclusive, i.e., there is no overlap therebetween. The database contains, in particular Zwicky boxes, morphological boxes or comparable data structures for compositional modeling, which describes the relevant properties of the design space compositionally including dimensions and alternatives within the individual dimensions.

As relevant road properties in the database, for example, a road width, a road pavement or a friction variable, highway markings, the existence of a certain road infrastructure, such as traffic lights, peripheral buildings along the road, traffic signs, pedestrian crossings, the curve radius of the road, the existence of intersections and exit ramps, and much more could be defined.

The following exemplary characteristics of a road map section could be stored in the database as matches to some of the exemplarily mentioned properties:

| | |
|---|---|
| road width | defined parameter range in meters |
| roadways | 1, 2, 3, 4, 5, 6 |
| traffic light | no, yes |
| pedestrian crossing | no, yes (pedestrian crosswalk), yes (pedestrian light) |
| roadside structure | no, yes - low (up to 1 meter), yes - high (>1 meter) |

Furthermore, additionally stored in the database in an especially preferred form is also information about which combinations of characteristics for different properties are not practical, respectively not permissible. These properties may be accessed upon selection of the characteristics, and they are automatically taken into consideration during the selection, so that no digital maps having such combinations are provided.

At least some of the characteristics for the relevant properties are automatically selected, in particular by a random selection, a selection in accordance with a predetermined algorithm also being possible. A random selection is performed, in particular through the use of a random generator or a pseudo-random generator. A partial configuration of characteristics of properties is additionally possible in an advantageous embodiment. For this purpose, the method may provide that a configuration be received in a step (not shown in FIG. 1), and a subset of the characteristics selected in accordance with this partial configuration. The remaining characteristics are automatically determined, so that all relevant properties, respectively all properties needed for providing the map are determined.

For example, partial configurations may be selected in a way that provides sets of maps which are customized for the desired purpose. For example, if a freeway function of an at least partially automated vehicle is to be tested in a simulation using the digital maps provided, the characteristic of the road property "number of lanes" could be limited to the values 2, 3 or 4. Thus, it is even possible to generate country-specific maps, for example, by limiting the characteristics to those which are permissible for left-hand traffic. Characteristics may also be automatically limited to specific parameter ranges. This may be done on the basis of parameters of a vehicle class (for example, car, truck), for example, in order to selectively generate intricate maps, respectively possible maps for the defined vehicle class, in particular for a use of the road maps provided in such a way for a respective vehicle system.

In step 102, the determined characteristics for the relevant road properties are transmitted to a computer-implemented map generator 13, where at least one digital map 14 is automatically generated and provided in a step 103 as a function of the transmitted characteristics.

A configuration may be implemented for the computation, generation and provision of the at least one digital road map, as to whether only one or a specific number of digital properties is to be calculated, generated and provided under the optionally provided partial configuration, or whether a predetermined, for example, complete coverage of the existing parameter space is desired.

If merely one road map is to be generated, a random selection of the permissible (and, after a possible partial configuration, free) characteristics of the road properties may, in fact, be made, taking into consideration impermissible combinations, and the road map may be computed, generated and provided on this basis. If a specific number of road maps is to be provided under the same conditions, the computation, generation and provision steps are repeated a corresponding number of times.

However, in alternative embodiments, a complete coverage of the design space, respectively a specific degree of coverage therefor may also be desired. To this end, equivalence classes may be defined; i.e., it may be defined when two provided maps are to be considered as equivalent, i.e., as not deviating from one another by more than a predetermined degree. Identical maps are always to be considered as equivalent. In the case of non-identical maps, parameter ranges may be defined, for example, within which, two maps for certain characteristics of a property are to be considered as equivalent with respect to this property. An example of the latter case could be two road maps where the road widths differ only slightly, i.e., they may be regarded as equivalent.

If the remaining properties are also to be considered as equivalent, these two road maps belong to the same equivalence class. In this stage, preconfiguration is possible in the computation, generation and provision of the digital maps, so that at least one or exactly one map is generated per equivalence class. A degree of coverage may also be defined (for example, road maps are provided for at least 50% of the equivalence classes) which is to be met in the computation, generation and provision.

In selecting characteristics 12 in step 101 or in computing the digital road map on the basis thereof in map generator 13, it is primarily the handling of parameter ranges that is significant. While discrete characteristics (such as "traffic lights: yes/no" or "lanes: 1, 2, 3, 4, 5, 6) may be directly selected, in the case of characteristics having continuous parameter ranges (for example, road width, curve radius, position of traffic signs or other infrastructure, position of intersections, gradient value), it is a question of which exact value from a parameter range is included in the calculation. Here, a random selection may be made from the respective parameter range. Alternatively, continuous properties may be varied in a targeted fashion to achieve a broadest possible coverage.

In preferred embodiments, the at least one digital road map is provided with relief information. An embodiment accomplishes this by providing altitudes or gradient values as road properties in the database. Alternatively, already computed and generated digital maps may also be adapted to a random or predetermined elevation profile before they are made available.

A consistency check may also be performed upon computation and generation of the digital road map, so that the selected parameters result in a realistic map.

An advantageous embodiment of the present invention provides that the computation and generation of the digital road map include creating one or a plurality of road map sections on the basis of the selected or transmitted characteristics of the road properties. A plurality of road map sections may be assembled to form road maps, transitions among the road map sections being automatically completed or adapted, so that, at the edges thereof, all elements of the road map sections join together cleanly (for example, by inserting clothoids in the case of curves). In each case, the road map sections may be randomly selected and combined in accordance with the predefined schema.

The digital road map is provided, in particular by output in a predetermined or configurable machine-readable output format. In the case of a further processing of the map(s) in a simulator, an output advantageously takes place in a data format which may be read by simulation environment 15, for example, in the OpenDRIVE format.

In an advantageous embodiment, the at least one digital map 14 provided may be transmitted in a step 104 to a simulation environment 15 which tests a vehicle system in a simulation for a drive along a route on digital map 14 and outputs a simulation result 16 in a step 105.

Advantageous embodiments provide that the vehicle system be automatically adaptable as a function of the results of the simulation in the case that the simulative test ascertains errors or weaknesses of the vehicle system by comparison with predetermined requirements placed on the performance of the vehicle system. In particular, software parameters of a software of the vehicle system may be adapted.

The digital road maps provided by the described methods may be compared in automated fashion with digital road maps of actual roads. As a function of the comparison, the road properties, including characteristics, may be automatically supplemented by previously excluded properties, characteristics, combinations or parameter ranges.

Figure 2:
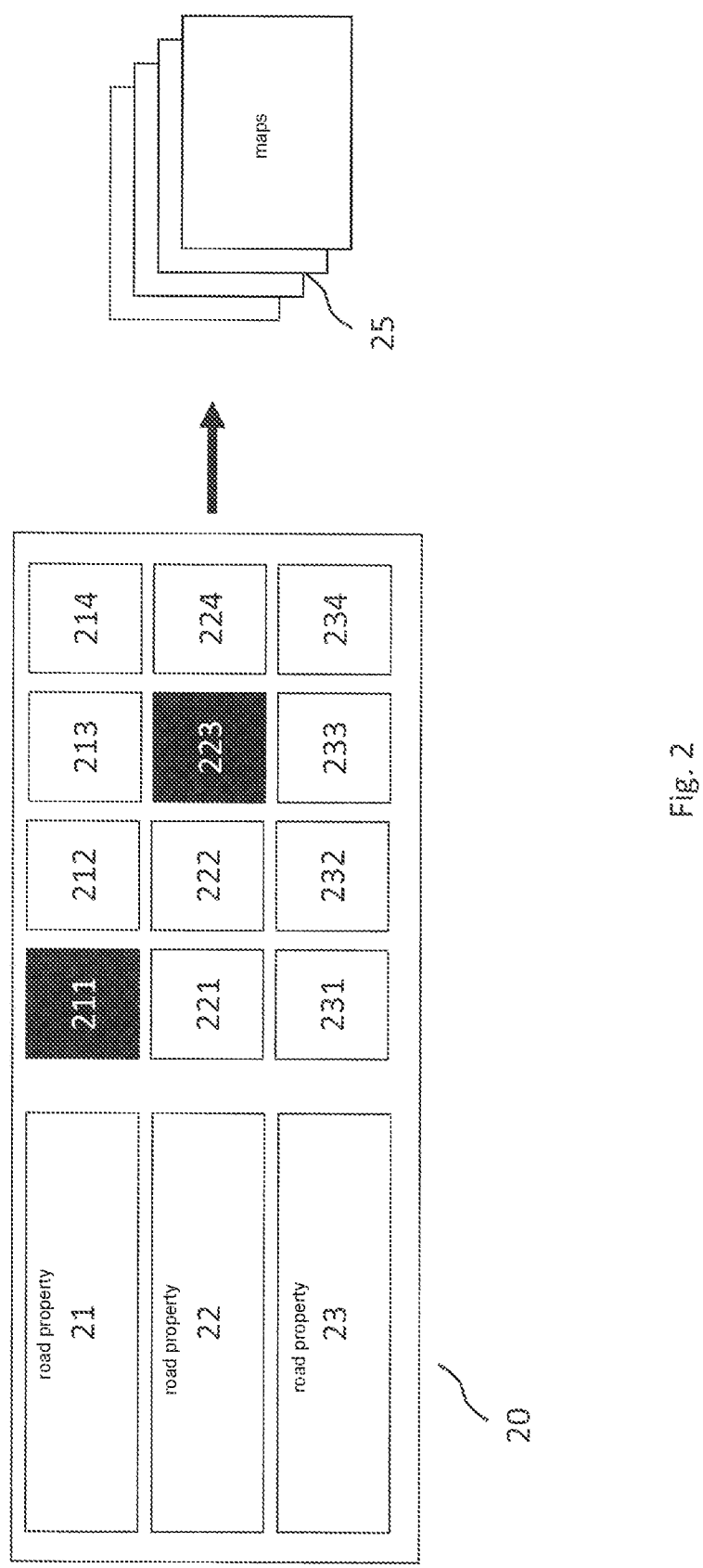
FIG. 2 schematically shows an exemplary provision of a plurality of digital road maps in the case of a partial configuration of a database containing road properties in accordance with the present invention.

FIG. 2 schematically shows an exemplary database 20. Respective characteristics 211 through 214, respectively 221 through 224, respectively 231 through 234 are stored there for road properties 21, respectively 22, respectively 23. In the case of preconfiguration of characteristic 211 for property 21, as well as of 223 for property 22, only the characteristics for property 23 are selected automatically, in particular randomly. When the entire area is covered by a map of each equivalence class, four maps (25) result in this example.

FIG. 3 schematically shows an exemplary database 30. Respective characteristics 311 through 314, respectively 321 through 324, respectively 331 through 334 are stored there for road properties 31, respectively 32, respectively 33. In the case of the preconfiguration of characteristic 323 for property 32, only the characteristics for property 31 and 33 are selected automatically, in particular randomly. When the entire area is covered by a map of each equivalence class, sixteen maps (35) result in this example.

What is claimed is:

1. A computer-implemented method for testing an at least partially automated vehicle system, the method comprising:
   (a) accessing, by a computer, a database in which are stored permissible characteristics of road properties for a multitude of road properties;
   (b) creating, by the computer, at least one road map section by selecting, for each road map section of the at least one road map section in an automated fashion from the database, a permissible characteristic of the permissible characteristics of road properties, for a first road property of the multitude of road properties;
   (c) providing, by the computer, a digital road map, the digital road map including the at least one road map section;
   wherein a plurality of digital road maps are provided by the computer in automated fashion one after another or in parallel by the computer repeatedly forming steps (a)-(c);
   wherein the repeated performing of steps (a)-(c) is interrupted when a predetermined degree of coverage is reached, the predetermined degree of coverage being reached when at least one digital road map is provided for each equivalence class of a plurality of equivalence classes, wherein each of the equivalence classes defines a road property of the multitude of road properties and a defined parameter range of the road property;
   transmitting the plurality of digital road maps to a computer-implemented simulation environment;
   testing the vehicle system by simulating, in the simulation environment, a drive along a route on the provided plurality of digital road maps, using the vehicle system;
   checking whether at least one predetermined requirement is observed by the vehicle system during the simulated drive, the at least one predetermined requirement including a safety requirement placed on the vehicle system; and
   automatically adapting software parameters of a software of the vehicle system based on the checking.

2. The method as recited in claim 1, wherein the permissible characteristic of the permissible characteristics of road properties for the first road property of the multitude of road properties, is selected randomly.

3. The method as recited in claim 1, wherein, one of the permissible characteristics of road properties from the database was already preconfigured to create the at least one road map section for a second road property of the multitude of road properties.

4. The method as recited in claim 3, wherein, to create the at least one road map section for a third road property of the multitude of road properties one permissible characteristic of the permissible characteristics of road properties is selected, wherein for the one permissible characteristic of the permissible characteristics of road properties for the third road property of the multitude of road properties, the selection is limited to a particular quantity or a particular range of the permissible characteristics in the database.

5. The method as recited in claim 4, wherein the one permissible characteristic of the permissible characteristics of road properties for the third road property of the multitude of road properties is selected randomly.

6. The method as recited in claim 1, wherein at least two road map sections are created, and the at least one digital road map provided includes the at least two road map sections.

7. The method as recited in claim 6, wherein the at least one digital road map is provided by automatically merging the at least two road map sections.

8. The method as recited in claim 7, wherein, during the merging of the at least two road map sections, there is an automatic consideration as to which of the at least two road map sections fit together and how the at least two road map sections fit together.

9. The method as recited in claim 1, wherein the permissible characteristics of the road properties exist as discrete alternatives or as alternative value ranges.

10. The method as recited in claim 1, wherein the permissible characteristics of road properties exist as discrete alternatives, and wherein a selection from the discrete alternatives of the permissible characteristic of the permissible characteristics of road properties is made by random selection from the discrete alternatives.

11. The method as recited in claim 1, wherein the permissible characteristics of the road properties exist as alternative value ranges, and wherein a selection from the alternative value ranges is made by a random selection of a value from the alternative value ranges.

12. The method as recited in claim 1, wherein, when the at least one road map section is created, unacceptable combinations of the permissible characteristics of different road properties of the multitude of road properties are automatically excluded during the selection.

13. The method as recited in claim 1, wherein an automatic consistency check is performed after the at least one digital road map is provided, and an inconsistent map is automatically improved or discarded or replaced.

14. The method as recited in claim 1, wherein the road properties and the permissible characteristics thereof are stored in the database as Zwicky boxes.

15. The method as recited in claim 1, wherein, before being provided, the at least one road map section or the at least one digital road map is automatically expanded by relief information by randomly selected altitude profiles.

16. The method as recited in claim 1, wherein the at least one digital road map provided is compared to a stored digital representative of an actual road, and the database is supplemented as a function of the comparison.

17. The method as recited in claim 1, wherein the method is discontinued when a predetermined number of digital road maps is reached.

18. The method as recited in claim 1, wherein, for certain respective characteristics of the permissible characteristics of road properties, a quantity of the respective characteristics or of a permissible range for the respective characteristics is automatically adapted or limited, as a function of a type of the vehicle system to be tested or properties of the vehicle system to be tested.

19. The method as recited in claim 1, wherein the parameters of the software of the vehicle system are automatically adapted based on the check revealing that at least one of the at least one predetermined requirement is not observed during the simulated drive.

20. A non-transitory machine-readable storage medium on which is stored a computer program for providing a digital road map for testing an at least partially automated vehicle system, the computer program, when executed by a computer, causing the computer to perform the following steps:
(a) accessing, by the computer, a database in which are stored permissible characteristics of road properties for a multitude of road properties;
(b) creating, by the computer, at least one road map section by selecting, for each road map section of the at least one road map sections in an automated fashion from the database, a permissible characteristic of the permissible characteristics of road properties, for a first road property of the multitude of road properties;
(c) providing, by the computer, the digital road map, the digital road map including the at least one road map section;
wherein a plurality of digital road maps are provided by the computer in automated fashion one after another or in parallel by the computer repeatedly forming steps (a)-(c); and
wherein the repeated performing of steps (a)-(c) is interrupted when a predetermined degree of coverage is reached, the predetermined degree of coverage being reached when at least one digital road map is provided for each equivalence class of a plurality of equivalence classes, wherein each of the equivalence classes defines a road property of the multitude of road properties and a defined parameter range of the road property;
transmitting the plurality of digital road maps to a computer-implemented simulation environment;
testing the vehicle system by simulating, in the simulation environment, drive along a route on the provided plurality of digital road maps, using the vehicle system;
checking whether at least one predetermined requirement is observed by the vehicle system during the simulated drive, the at least one predetermined requirement including a safety requirement placed on the vehicle system; and
automatically adapting software parameters of a software of the vehicle system based on the checking.

21. The method as recited in claim 7, wherein, during the merging of the at least two road map sections, transitions between the at least two road map sections are automatically adapted or completed.

* * * * *